United States Patent [19]

Inaike et al.

[11] Patent Number: 4,535,105
[45] Date of Patent: Aug. 13, 1985

[54] WHOLLY AROMATIC POLYAMIC ACID SOLUTION COMPOSITION

[75] Inventors: Toshihiro Inaike; Shuji Yamamoto; Shunji Ohe; Kazunori Otsuka, all of Ichihara, Japan

[73] Assignee: Ube Industries, Ltd., Yamaguchi, Japan

[21] Appl. No.: 587,177

[22] Filed: Mar. 7, 1984

[30] Foreign Application Priority Data

Mar. 8, 1983 [JP] Japan .................. 58-36682
May 9, 1983 [JP] Japan .................. 58-79355

[51] Int. Cl.$^3$ .............. C08K 5/34; C08K 5/41; C08K 5/20; C08L 79/08
[52] U.S. Cl. .................. 524/104; 524/173; 524/233; 528/229; 528/310
[58] Field of Search .......... 528/229, 310; 524/232, 524/233, 104, 173

[56] References Cited

U.S. PATENT DOCUMENTS 4,358,581 11/1982 Sutton, Jr. .................. 528/229
4,405,770 9/1983 Schoenberg et al. ........... 528/229
4,454,276 6/1984 Uda et al. ................... 528/229

FOREIGN PATENT DOCUMENTS 855794 11/1970 Canada ........................ 528/229
1962588 7/1970 Fed. Rep. of Germany ...... 528/229

Primary Examiner—Allan M. Lieberman
Attorney, Agent, or Firm—Burgess, Ryan & Wayne

[57] ABSTRACT

An aromatic polyamic acid solution composition useful as an electrically insulating varnish, comprises (1) an aromatic polyamic acid which is a polymerization product of (A) a tetracarboxylic acid component containing at least 80 molar % of the sum of (a) a first acid ingredient consisting of 3,3',4,4'-biphenyltetracarboxylic dianhydride and (b) a second acid ingredient consisting of at least one member selected from the group consisting of pyromellitic dianhydride, and 3,3'4,4'-benzophenone tetracarboxylic dianhydride, the molar ratio of the first acid ingredient to the second acid ingredient being in the range of from 30:70 to 75:25, with (B) an amine component consisting of at least one aromatic amine in a molar ratio of the tetracarboxylic acid component to the amine component of from 97:100 to 103:100, and which polymeric acid has a logarithmic viscosity number of from 0.1 to 1.5 determined in a concentration of 0.5 g/100 ml in N-methyl-2-pyrrolidone at a temperature of 30° C., and dissolved in a concentration of from 5% to 40% by weight in (2) an organic polar solvent.

10 Claims, No Drawings

4,535,105

WHOLLY AROMATIC POLYAMIC ACID SOLUTION COMPOSITION

BACKGROUND OF THE INVENTION

1. Field of the Invention

The present invention relates to a wholly aromatic polyamic acid solution composition. More particularly, the present invention relates to a solution composition of a wholly aromatic polyamic acid in an organic polar solvent, useful as an electrically insulating varnish.

2. Description of the Prior Art

It is known that aromatic polyimides which have been prepared by imidizing the corresponding aromatic polyamic acids exhibit excellent heat resistance, electrically insulating property, and mechanical properties. Accordingly, for the purpose of coating various materials, especially, the coating and insulating of various electric materials, for example, electric wires and cords, a solution of an aromatic polyamic acid is applied onto a surface of the material to be coated and then heat-imidized to react with the corresponding aromatic polyimide.

The aromatic polyamic acid is prepared by condense-polymerizing an acid component consisting of at least one tetracarboxylic acid compound with an amine component consisting of at least one diamine compound.

Usually, the tetracarboxylic acid compound is selected from pyromellitic dianhydride, 3,3',4,4'-benzophenonetetracarboxylic dianhydride and 3,3',4,4'-biphenyltetracarboxylic dianhydride.

Also, the diamine compound is usually selected from 4,4'-diaminodiphenylmethane, 4,4'-diaminodiphenylether, m-phenylenediamine and p-phenylenediamine.

That is, the conventional aromatic polyamic acid usually used is a condensation-polymerization product of the above-mentioned aromatic tetracarboxylic acid compound with the aromatic diamine compound. Especially, an aromatic polyamic acid prepared by the condensation-polymerization of pyromellitic acid dianhydride with an aromatic diamine is well-known and is beneficially used for various purposes.

However, the aromatic polyamic acid derived from pyromellitic dianhydride and an aromatic diamine compound exhibits disadvantageous in its solution properties and processability, as follows.

For example, when a solution of a conventional aromatic polyamic acid derived from pyromellitic dianhydride is used to coat a surface of a material and to electrically insulate the material surface, the aromatic polyamic acid solution exhibits an unsatisfactory storage stability. That is, the aromatic polyamic acid solution has a tendency of rapidly increasing its viscosity and then gelling within a short period of storage at an atmospheric temperature. When the aromatic polyamic acid solution contains water, the viscosity of the solution significantly decreases within a short period of storage at atmospheric temperature. In order to prevent such rapid changes in the viscosity, it is necessary that the aromatic polyamic acid solution be stored in a refrigerator. This necessity for storage in the refrigerator causes the industrial use of the aromatic polyamic acid derived from pyromellitic dianhydride to be disadvantageous. Also, refrigeration cannot completely prevent the change in the viscosity of the aromatic polyamic acid solution if the solution is stored in a refrigerator for a long period.

Also, when another conventional type of aromatic polyamic acid derived, for example, from 3,3',4,4'-biphenyltetracarboxylic dianhydride and an aromatic diamine, is applied as an electrically insulating varnish to a surface of an electric wire, and cured thereon, the resultant cured coating exhibits an undesirable opaque appearance and has an unsatisfactory resistance to salt water (brine). Therefore, this type of aromatic polyamic acid is unsatisfactory as an electrically insulating material.

Furthermore, when still another conventional type of aromatic polyamic acid derived from benzophenonetetracarboxylic dianhydride and an aromatic diamine is used, the resultant corresponding aromatic polyimide exhibits unsatisfactory mechanical strength and heat resistance and, therefore, is not adequate for practical use.

Accordingly, a strong demand has arisen for a new type of aromatic polyamic acid solution composition which can eliminate all of the above-mentioned disadvantages of the conventional aromatic polyamic acid solution.

SUMMARY OF THE INVENTION

An object of the present invention is to provide a wholly aromatic polyamic acid solution composition which exhibits a relatively low viscosity and an enhanced stability during storage over a long period at an atmospheric temperature.

Another object of the present invention is to provide a wholly aromatic polyamic acid solution composition which is capable of being converted to the corresponding aromatic polyimide having an excellent heat resistance, electrically insulating property, and mechanical strength.

Still another object of the present invention is to provide a wholly aromatic polyamic acid solution composition useful as a coating varnish which is applied, for example, to a surface of an electric wire, and cured thereon, to form a solid coating layer which is clear and has a satisfactory resistance to salt water.

The above-mentioned objects can be attained by the wholly aromatic polyamic acid solution composition of the present invention which comprises: (1) an aromatic polyamic acid which is a polymerization product of (A) a tetracarboxylic acid component containing at least 80 molar % of the sum of (a) a first acid ingredient consisting of at least one member selected from the group consisting of 3,3',4,4'-biphenyl tetracarboxylic dianhydride and its functional derivatives and (b) a second acid ingredient consisting of at least one member selected from the group consisting of pyromellitic dianhydride, its functional derivatives, 3,3',4,4'-benzophenone tetracarboxylic dianhydride and its functional derivatives, the molar ratio of the first acid ingredient to the second acid ingredient being in the range of from 30:70 to 75:25, with (B) an amine component consisting of at least one aromatic amine in a molar ratio of the tetracarboxylic acid component to the amine component of from 97:100 to 103:100, and which polyamic acid has a logarithmic viscosity number of from 0.1 to 1.5 determined in a concentration of 0.5 g/100 ml in N-methyl-2-pyrrolidone at a temperature of 30° C., and dissolved at a concentration of from 5% to 40% by weight in (2) an organic polar solvent.

DESCRIPTION OF THE PREFERRED EMBODIMENTS

The wholly aromatic polyamic acid solution composition of the present invention is a solution of a specific aromatic polyamic acid dissolved at a concentration of from 5% to 40% by weight in an organic polar solvent.

The specific aromatic polyamic acid is a condensation polymerization product of a specific tetracarboxylic acid component with an amine component in a molar ratio of the tetracarboxylic acid component to the amine component of from 97:100 to 103:100, and has a logarithmic viscosity number of from 0.1 to 1.5 determined at a concentration of 0.5 g/100 ml in N-methyl-2-pyrrolidone at a temperature of 30° C.

The above-mentioned specific tetracarboxylic acid component contains at least 80 molar %, preferably at least 90 molar %, of the sum of (a) a first acid ingredient consisting of at least one member selected from 3,3',4,4'-biphenyltetracarboxylic dianhydride and its functional derivatives and (b) a second acid ingredient consisting of at least one member selected from pyromellitic dianhydride, 3,3',4,4'-benzophenone tetracarboxylic dianhydride, and functional derivatives of the above-mentioned compounds. The functional derivatives of 3,3',4,4-biphenyl tetracarboxylic dianhydride, pyromellitic dianhydride, and 3,3',4,4'-benzophenone tetracarboxylic dianhydride include tetracarboxylic acids, diacid-monoanhydrides, diestermonoanhydrides, diaciddiesters, and tetraesters of the above-mentioned compounds.

In the tetracarboxylic acid component, the amount of the sum of the first and second acid ingredients is at least 80 molar %, preferably at least 90 molar %. If the content of the sum of the first and second acid ingredients is less than 80 molar %, the resultant aromatic polyamic acid solution composition is disadvantageous in that the resultant aromatic polyimide derived from the polyamic acid exhibits a poor heat resistance and unsatisfactory mechanical properties. More preferably, the tetracarboxylic acid component consists essentially of the first and second acid ingredients.

In the tetracarboxylic acid component, the molar ratio of the first acid ingredient to the second acid ingredient is in the range of from 30:70 to 75:25, preferably, 45:55 to 75:25. If the molar ratio is less than 30:70, the resultant aromatic polyamic acid solution composition is disadvantageous in that the solution exhibits an unsatisfactory storage stability and/or the resultant corresponding aromatic polyimide exhibits unsatisfactory mechanical properties. Also, if the molar ratio is more than 75:25, the resultant aromatic polyamic acid solution composition is disadvantageous in that when the solution is applied, as an electrically insulating material, to a surface of an electric wire and cured thereon, the resultant cured coating exhibits an undesirable opaque appearance and an unsatisfactory resistance to salt water. The tetracarboxylic acid component can contain 20 molar % or less of an additional acid ingredient, for example, 2,3,6,7-naphthalene tetracarboxylic dianhydride, 2,3,3',4'-biphenyl tetracarboxylic dianhydride, 2,2',3,3'-biphenyl tetracarboxylic dianhydride bis (3,4-dicarboxyphenyl)methane dianhydride, 2,2-bis(3,4-dicarboxyphenyl) propane dianhydride, bis (3,4-dicarboxyphenyl) sulfone dianhydride, bis (3,4-dicarboxyphenyl) ether dianhydride and butane tetracarboxylic dianhydride, and functional derivatives of the above-mentioned compounds. In addition to the first and second acid ingredients. It is preferable that the additional acid ingredient be selected from aromatic tetracarboxylic dianhydrides and functional derivatives thereof.

The amine component consists of at least one aromatic diamine compound selected from, for example, those of the formulae (I), (II) and (III):

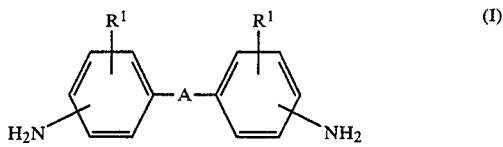

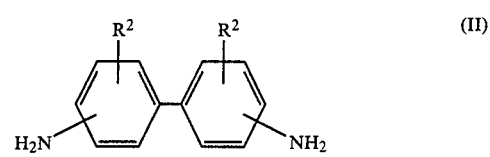

and

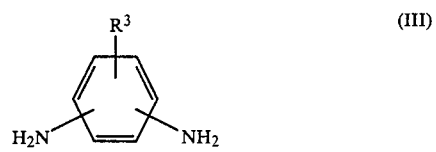

wherein $R^1$, $R^2$ and $R^3$ respectively represent, independent from each other, a member selected from the group consisting of a hydrogen atom, alkyl radicals having 1 to 5 carbon atoms, carboxyl radical, and alkoxyl radicals having 1 to 5 carbon atoms, and A represents a divalent radical selected from the group consisting of those of the formulae: —O—, —S—, —CO—, —$SO_2$—, —SO—, and —$CH_2$—. The aromatic diamine compound can be selected from 4,4'-diaminodiphenylether, 4,4'-diaminodiphenylmethane, 4,4-diaminodiphenylthioether, 4,4'-diaminodiphenylbenzophenone, 4,4'-diaminodiphenylsulfone, o-tolidine, o-dianisidine, 3,5-diaminobenzoic acid, and m- and p-phenylenediamines.

Preferably, the amine component consists essentially of 4,4'-diaminodiphenylether alone. However, the amine component may consist essentially of at least 70 molar %, preferably at least 80 molar %, of 4,4'-diaminodiphenylether and 30 molar % or less of at least one aromatic diamine compound different from 4,4'-diaminodiphenylether. The preferable aromatic diamine compounds to be used together with 4,4'-diaminodiphenylether include 4,4'-diaminodiphenylmethane, 4,4'-diaminodiphenylthioether, 4,4'-diaminodiphenylbenzophenone, 4,4'-diaminodiphenylsulfone, o-tolidine, o-dianisidine, 3,5-diaminobenzoic acid, and m- and p-phenylenediamines.

In the preparation of the wholly aromatic polyamic acid, the molar ratio of the acid component to the amine component is in the range of from 97:100 to 103:100, preferably, from 99:100 to 101:100. If the molar ratio is larger than 103:100 or smaller than 97:100, the resultant aromatic polyamic acid is disadvantageous in that the resultant corresponding aromatic polyimide exhibits unsatisfactory mechanical properties.

The condensation-polymerization of the tetracarboxylic acid component and the amine component can be effected by any conventional method. For example, the acid tetracarboxylic component and the amine component in a predetermined molar ratio are dissolved and condensation-polymerized in an organic polar solvent, for example, N-methyl-2-pyrrolidone. In another example, the tetracarboyxlic acid component and the amine component are condensation-polymerized in an organic polar solvent in the presence of a small amount of water. In still another example, the tetracarboxylic acid component is reacted with an excessive molar amount of the amine component to produce a oligomeric intermediate, and then the oligomeric intermediate and an additional amount of the tetracarboxylic acid component are condensation-polymerized into a desired aromatic polyamic acid, the molar ratio of the sum of the initial and additional amounts of the tetracarboxylic acid component used to the amount of the amine component used being approximately 1.0. In still another further example, the amine component is reacted with an excessive amount of the tetracarboxylic acid component to produce an oligomeric intermediate, and the resultant intermediate is condensation-polymerized with an additional amount of the amine component to provide the desired aromatic polyamic acid, the molar ratio of the amount of the tetracarboxylic acid component used to the sum of the initial and additional amounts of the amine component used being approximately 1.0. In an additional example, a first oligomeric intermediate is prepared from the acid component with an excessive amount of the amine component; separately, a second oligomeric intermediate is prepared from the amine component and an excessive amount of the acid component, the molar ratio of the sum of the amounts of the acid components to the sum of the amounts of the amine components used in the first and second stages being approximately 1.0; and the first and second oligomeric intermediates are mixed to each other and, if necessary, to additional amounts of the acid and/or amine components and are condensation-polymerized to provide the desired polyamic acid.

The aromatic polyamic acid usable for the present invention has a logarithmic viscosity number of from 0.1 to 1.5, preferably from 0.15 to 1.2, determined in a concentration of 0.5 g/100 ml in N-methyl-2-pyrrolidone at a temperature of 30° C. When the logarithmic viscosity number is less than 0.1, the resultant aromatic polyamic acid solution composition results in an unsatisfactory mechanical strength of the corresponding polyimide article, for example, a membrane. When logarithmic viscosity number is larger than 1.5, the solution composition of the resultant aromatic polyamic acid which has an excessively high molecular weight, exhibits an excessively high viscosity and, therefore, is not easily handled and has a poor processability.

The aromatic polyamic acid is dissolved in a high concentration of from 5% to 40%, preferably from 6% to 35%, more preferably from 10% to 35% by weight in an organic polar solvent.

The solution composition of the present invention is prepared in such a manner that a desired aromatic polyamic acid is isolated from a condensation polymerization mixture and is then dissolved an organic polar solvent. In another manner of preparation, the desired aromatic polyamic acid is prepared in a polymerization medium consisting of the same organic polar solvent as that in the desired solution composition. In this type of preparation of the solution composition, the concentration of the aromatic polyamic acid is adjusted by controlling the amount of the organic polar solvent in the solution composition.

The organic polar solvents usable for the present invention are preferably selected from those having a boiling point of 300° C. or less, more preferably, of 250° C. or less, under atmospheric pressure. That is, the organic polar solvents may be selected from N-methyl-2-pyrrolidone, dimethylsulfoxide, N,N-dimethylacetamide, N,N-dimethylformamide, N,N-diethylacetamide, N,N-diethylformamide and dimethylsulfone. The more preferable compounds for the organic polar solvents are N-methyl-2-pyrrolidone, dimethylsulfoxide, N,N-dimethylacetamide and N,N-dimethylformamide. The organic polar solvent usable for the present invention may contain a minor amount of an additional organic liquid consisting of at least one member selected from benzene, toluene, benzonitrile, xylene, solvent naphtha, and dioxane.

It is preferable that the preparation of the solution composition of the present invention is carried out in the presence of a small amount, preferably, 10% by weight or less, of water. However, after the preparation is completed, it is preferable that the water is removed to an extent as large as possible from the resultant solution composition by a conventional water-removing method, for example, evaporation of water under a reduced pressure. After the water-removing method is applied to the resultant solution composition, the residual amount of water in the solution composition can be determined by the Karl Fischer quantitative analysis method. The solution composition of the present invention may contain 3% by weight or less, preferably 2% by weight or less, of water.

For practical use in industry, it is preferable that the wholly aromatic polyamic acid solution composition of the present invention exhibit a rotation viscosity of from 0.1 to 10,000 poises, more preferably from 0.5 to 5,000 poises, still more preferably 1 to 2,000 poises, determined at a temperature of 30° C. Although the wholly aromatic polyamic acid is contained in a high concentration of from 5% to 40% by weight, the resultant solution composition of the present invention exhibits a relatively low viscosity and the viscosity is maintained at a stable level at room temperature for a long period of storage. For example, when the solution composition of the present invention is stored at a temperature of 30° C., the viscosity of the solution composition is maintained at a substantially unchanged level over a period of about 6 months. Also, even when the solution composition is stored at a temperature of about 50° C., the viscosity of the solution composition is maintained substantially constant over a period of about 3 months.

Also, the solution composition of the present invention is advantageous in that, even when the solution composition is stored at room temperature for a long period of time, substantially no gelation of the solution composition occurs. Accordingly, as long as the solution composition is stored under ordinary conditions, no refrigerator is necessary for the purpose of preventing undesirable change in the quality of the solution composition.

SPECIFIC EXAMPLES

The present invention will be further explained in the following examples which are intended to be representative rather than restrictive of the scope of the present invention.

EXAMPLE 1

A column type polymerization vessel having a capacity of 300 ml was charged with a polymerization mixture consisting of 14.71 g (0.05 moles) of 3,3',4,4'-biphenyltetracarboxylic dianhydride, 16.11 g (0.05 moles) of 3,3',4,4'-benzophenonetetracarboxylic dianhydride, 20.02 g (0.1 mole) of 4,4'-diaminodiphenylether, 197.3 g of N-methyl-2-pyrrolidone and 6.10 g of water. The polymerization mixture was stirred at a temperature of 30° C. under atmospheric pressure for 44 hours. A polymer solution was obtained containing the resultant aromatic polyamic acid having a logarithmic viscosity number of 0.56 determined in a concentration of 0.5 g/100 ml in N-methyl-2-pyrrolidone at a temperature of 30° C.

The polymer liquid was subjected to a water-removing process under a reduced pressure of 0.01 atmospheres at a temperature of 50° C. for 2 hours. The resultant wholly aromatic polyamic acid solution composition contained 1.1% by weight of water which was determined in accordance with Karl Fischer's method. The solution composition also contained 22.0% by weight of the aromatic polyamic acid and exhibited a rotation viscosity of 52.0 poises determined at a temperature of 30° C.

After the solution composition was stored at a temperature of 50° C. for 60 days, it was found that the rotation viscosity of the solution composition was 54 poises at 30° C. Also, after the solution composition was stored at a temperature of 50° C. for 120 days, it was found that the rotation viscosity of the solution composition was 58 poises at 30° C. However, it was found that the storage of the solution composition at 50° C. for 140 days caused the viscosity of the solution composition to significantly increase and the fluidity of the solution composition to decrease.

Furthermore, when the solution composition was stored at a temperature of 30° C., the viscosity of the stored solution composition was 66 poises even after 180 days of storage. That is, the increase in viscosity of the stored solution composition was very small even after a long period of storage.

In all of the above-mentioned storage tests, the stored solution compositions of the present invention were maintained in a state of uniform solution without the undesirable formation of precipitates until the solution composition gelled.

EXAMPLE 2

A polymerization liquid containing an aromatic polyamic acid was prepared in the same manner as that described in Example 1, except that the polymerization mixture consisted of 20.59 g (0.07 moles) of 3,3',4,4'-biphenyltetracarboxylic dianhydride, 9.67 g (0.03 moles) of 3,3',4,4'-benzophenonetetracarboxylic dianhydride, 20.02 g (0.10 moles) of 4,4'-diaminodiphenylether, 180.40 g of N-methyl-2-pyrrolidone and 5.6 g of water, and the polymerization procedure was carried out at a temperature of 50° C. for 20 hours. The resultant polymer solution contained an aromatic polyamic acid having a logarithmic viscosity number of 0.55. The polymer solution was subjected to the same water-removing process as that described in Example 1. The resultant solution composition contained 22.5% by weight of the aromatic polyamic acid and 1.0% by weight of water and had a rotation viscosity of 60 poises at 30° C.

When the solution composition was stored at a temperature of 50° C., the rotation viscosity of the solution composition slightly increased to 67 poises after 60 days of storage and gelled after 130 days of storage. Until the solution composition gelled, the solution composition was maintained in a state of uniform solution without the formation of precipitates.

EXAMPLE 3

The same procedures as those described in Example 2 were carried out except that 3,3',4,4'-biphenyltetracarboxylic dianhydride and 3,3',4,4'-benzophenonetetracarboxylic dianhydride were used in amounts of 17.65 g (0.06 moles) and 12.89 g (0.04 moles) respectively; the N-methyl-2-pyrrolidone was replaced by 190.7 g of dimethylacetamide; water was contained in an amount of 5.9 g in the polymerization mixture; the resultant solution composition contained 0.9% by weight of water and 22.0% by weight of an aromatic polyamic acid having a logarithmic viscosity of 0.53 and exhibited a rotation viscosity of 45 poises at 30° C.

When the solution composition was stored at a temperature of 50° C., the solution composition exhibited a rotation viscosity of 52 poises after storage for 60 days, and then gelled after storage for 140 days. In the storage at 50° C., no precipitate was found in the solution composition which was in a state of uniform solution until it gelled.

EXAMPLE 4

The same procedures as those described in Example 1 were carried out except that in the preparation of the polymer solution, 3,3',4,4'-biphenyltetracarboxylic dianhydride and 3,3',4,4'-benzophenonetetracarboxylic dianhydride were used in amounts of 8.83 g (0.03 moles) and 22.56 g (0.07 moles), the N-methyl-2-pyrrolidone was replaced by 189.5 g of dimethylsulfoxide and water was present in an amount of 5.9 g.

The resultant polymer solution contained an aromatic polyamic acid having a logarithmic viscosity of 0.46. After the water-removing process was completed, the resultant solution composition contained 1.1% by weight of water and 22.4% by weight of the aromatic polyamic acid and exhibited a rotation viscosity of 43 poises at 30° C.

After the resultant solution composition was stored at a temperature of 50° C. for 60 days, the rotation viscosity of the solution composition was still at a low level of 44 poises, and after storage of 130 days, the solution composition gelled. Before the gelation, the solution composition was maintained in a state of a clear uniform solution and no precipitation was formed therein.

EXAMPLE 5

The same procedures as those described in Example 1 were carried out except that the 4,4'-diaminodiphenylether was replaced by 10.81 g (0.1 mole) of m-phenylenediamine, the N-methyl-2-pyrrolidone and water were used in an amount of 151.3 g and 4.7 g, respectively, and the polymerization procedure was carried out at a temperature of 30° C. for 20 hours. The resultant aromatic polyamic acid exhibited logarithmic viscosity of 0.43.

After the water-removing process, the resultant solution composition containing the aromatic polyamic acid contained 0.8% by weight of water and 22.1% by weight of the aromatic polyamic acid and exhibited a rotation viscosity of 38 poises.

After storage at a temperature of 50° C. for 60 days, the stored solution composition exhibited a still small rotation viscosity of 36 poises, and after 130 days of storage, the solution composition gelled. Until gelation, the solution composition was in a state of a clear uniform solution and no precipitates were formed.

EXAMPLE 6

The same procedures as those described in Example 1 were carried out except that in the preparation of the polymer solution, the 4,4'-diaminodiphenylether was replaced by 19.83 g (0.1 mole) of 4,4'-diaminodiphenylmethane, N-methyl-2-pyrrolidone and water were used in amounts of 188.0 g and 5.8 g, respectively, and the polymerization procedure was carried out at a temperature of 30° C. for 20 hours. The resultant aromatic polyamic acid exhibited a logarithmic viscosity of 0.49.

After the water-removing process, the resultant solution composition contained 0.9% by weight of water and 22.0% by weight of the aromatic polyamic acid and exhibited a rotation viscosity of 43 poises at 30° C.

After storage for 60 days at a temperature of 50° C., the solution composition exhibited a small rotation viscosity of 41 poises, and after storage for 140 days, it gelled. Until gelation occurred, the solution composition was in a state of a clear uniform solution and contained no precipitates.

EXAMPLE 7

(1) Preparation of Oligometric Intermediate A

A column type polymerization vessel having a capacity of 300 ml was charged with a pre-polymerization mixture consisting of 11.77 g (0.04 moles) of 3,3',4,4'-biphenyltetracarboxylic dianhydride, 4.00 g (0.02 moles) of 4,4'-diaminodiphenylether and 63.09 g of N-methyl-2-pyrrolidone. The pre-polymerization mixture was stirred at a temperature of 50° C. under ambient pressure for 3 hours. The resultant pre-polymerization liquid was a dispersion containing an oligomeric intermediate and non-reacted 3,3',4,4'-biphenyltetracarboxylic dianhydride.

(2) Preparation of Oligomeric Intermediate B

The same type of vessel as that mentioned above and having a capacity of 300 ml was charged with a pre-polymerization mixture consisting of 19.33 g (0.06 moles of 3,3',4,4'-benzophenonetetracarboxylic dianhydride, 18.02 g (0.09 moles) of 4,4'-diaminodiphenylether and 149.4 g of N-methyl-2-pyrrolidone. The pre-polymerization mixture was stirred at a temperature of 30° C. under ambient pressure for 3 hours. The resultant pre-polymerization liquid was a clear uniform solution containing 20% by weight of an oligomeric intermediate B and exhibited a rotation viscosity of 3.5 poises at 30° C.

(3) Preparation of Aromatic Polyamic Acid Solution Composition

A polymerization mixture consisting of 78.86 g of the oligomeric intermediate A and 124.51 g of the oligomeric intermediate B was subjected to a polymerization at a temperature of 50° C. for 3 hours while it is stirred.

The resultant aromatic polyamic acid solution composition contained 20.0% by weight of the polyamic acid having a logarithmic viscosity of 0.63, and exhibited a rotation viscosity of 38 poises at 30° C.

The rotation viscosity of the solution composition was changed to 43 poises after storage for 60 days at 50° C. and then to 49 poises after storage of 120 days at 50° C. After storage of 140 days at 50° C., the stored solution composition gelled. Until the gelation, the stored solution composition was in a state of a clear uniform solution and contained no precipitates.

COMPARATIVE EXAMPLE 1

The same procedures as those described in Example 1 were carried out except that the polymerization mixture consisted of 29.42 g (0.1 mole) of 3,3',4,4'-biphenyltetracarboxylic dianhydride, 20.02 g (0.1 mole) of 4,4'-diaminodiphenylether, 183.7 g of N-methyl-2-pyrrolidone 20.4 g of water and no 3,3',4,4'-benzophenonetetracarboxylic dianhydride, and was stirred at a temperature of 50° C. for 60 hours. After the water-removing process, the resultant solution composition contained 22.3% by weight of a comparative aromatic polyamic acid having a logarithmic viscosity of 0.45 and 1.1% by weight of water, exhibited a rotation viscosity of 41 poises at 30° C.

After storage for 60 days at a temperature of 50° C., the stored solution composition exhibited a remarkably increased rotation viscosity of 63 poises, and after storage of 70 days at 50° C., the stored solution composition gelled and became insoluble in N-methyl-2-pyrrolidone.

COMPARATIVE EXAMPLE 2

The same procedures as those described in Example 1 were carried out except that a polymerization mixture consisted of 23.54 g (0.08 moles) of 3,3',4,4'-biphenyltetracarboxylic dianhydride, 6.44 g (0.02 moles) of 3,3',4,4'-benzophenonetetracarboxylic dianhydride, 20.02 g (0.1 mole) of 4,4'-diaminodiphenylether, 174.2 g of N-methyl-2-pyrrolidone and 19.36 g of water and the polymerization temperature and time were 50° C. and 20 hours, respectively.

After the water-removing process was completed, the resultant solution composition contained 23.2% by weight of a comparative aromatic polyamic acid having a logarithmic viscosity of 0.49 and 1.0% by weight of water, and exhibited a rotation viscosity of 60 poises at 30° C.

When the solution composition was stored at a temperature of 50° C., the stored solution composition exhibited a significantly increased rotation viscosity of 85 poises 60 days after the start of storage, and gelled into an insoluble state 80 days after the start of storage.

COMPARATIVE EXAMPLE 3

The same procedures as those described in Example 1 were carried out except that a polymerization mixture consisted of 5.88 g (0.02 moles) of 3,3',4,4'-biphenyltetracarboxylic dianhydride, 25.78 g (0.08 moles) of 3,3',4,4'-benzophenonetetracarboxylic dianhydride, 16.02 g (0.08 moles) of 4,4'-diaminediphenylether, 2.16 g (0.02 moles) of m-phenylenediamine, 176.2 g of N-methyl-2-pyrrolidone and 5.45 g of water and the polymerization temperature and time were 30° C. and 20 hours, respectively.

After the water-removing process was completed, the resultant solution composition contained 22.8% by weight of a comparative aromatic polyamic acid having a logarithmic viscosity of 0.56 and 0.9% by weight of water, and exhibited a rotation viscosity of 61 poises at 30° C.

When the solution composition was stored at a temperature of 50° C., the stored solution composition exhibited a rotation viscosity of 59 poises 60 days after the start of storage and gelled into an insoluble state 80 days after the start of storage.

COMPARATIVE EXAMPLE 4

The same procedures as those described in Example 1 were carried out except that a polymerization mixture consisted of 32.22 g (0.1 mole) of 3,3',4,4'-benzophenonetetracarboxylic dianhydride, 20.02 g (0.1 mole) of 4,4'-diaminodiphenylether, 223.2 g of N-methyl-2-pyrrolidone and 6.90 g of water.

After the water-removing process was completed, the resultant solution composition contained 20.0% by weight of a comparative aromatic polyamic acid having a logarithmic viscosity of 0.50 and 0.9% by weight of water, and exhibited a rotation viscosity of 30 poises at 30° C.

When the solution composition was stored at a temperature of 50° C., the stored solution composition exhibited a rotation viscosity of 29 poises 60 days after the start of storage and gelled into an insoluble state 70 days after the start of storage.

COMPARATIVE EXAMPLE 5

The same procedures as those described in Example 1 were carried out except that a polymerization mixture consisted of 23.54 g (0.08 moles) of 3,3',4,4'-biphenyltetracarboxylic dianhydride, 6.44 g (0.02 moles) of 3,3',4,4'-benzophenonetetracarboxylic dianhydride, 10.81 g (0.1 mole) of m-phenylenediamine, 151.5 g of N-methyl-2-pyrrolidone and 4.74 g of water.

After the water-removing process was completed, the resultant solution composition contained 21.9% by weight of a comparative aromatic polyamic acid having a logarithmic viscosity of 0.41 and 0.8% by weight of water, and exhibited a rotation viscosity of 32 poises at 30° C.

When the solution composition was stored at a temperature of 50° C., the stored solution composition exhibited a rotation viscosity of 29 poises 60 days after the start of storage and gelled into an insoluble state 80 days after the start of storage.

COMPARATIVE EXAMPLE 6

The same procedures as those described in Example 1 were carried out except that a polymerization mixture consisted of 5.88 g (0.02 moles) of 3,3',4,4'-biphenyltetracarboxylic dianhydride, 25.78 g (0.08 moles) of 3,3',4,4'-benzophenonetetracarboxylic dianhydride, 10.81 g (0.1 mole) of m-phenylenediamine, 153.4 g of N-methyl-2-pyrrolidone and 4.74 g of water.

After the water-removing process was completed, the resultant solution composition contained 22.3% by weight of a comparative aromatic polyamic acid having a logarithmic viscosity of 0.39 and 0.8% by weight of water, and exhibited a rotation viscosity of 35 poises at 30° C.

When the solution composition was stored at a temperature of 50° C., the stored solution composition exhibited a rotation viscosity of 33 poises 60 days after the start of storage and gelled into an insoluble state 80 days after the start of storage.

COMPARATIVE EXAMPLE 7

The same procedures as those described in Example 1 were carried out except that a polymerization mixture consisted of 23.54 g (0.08 moles) of 3,3',4,4'-biphenyltetracarboxylic dianhydride, 6.44 g (0.02 moles) of 3,3',4,4'-benzophenonetetracarboxylic dianhydride, 19.83 g (0.1 mole) of 4,4'-diaminodiphenylmethane, 173.3 g of N-methyl-2-pyrrolidone and 5.36 g of water.

After the water-removing process was completed, the resultant solution composition contained 23.1% by weight of a comparative aromatic polyamic acid having a logarithmic viscosity of 0.45 and 0.9% by weight of water, and exhibited a rotation viscosity of 45 poises at 30° C.

When the solution composition was stored at a temperature of 50° C., the stored solution composition exhibited a rotation viscosity of 43 poises 60 days after the start of storage and gelled into an insoluble state 80 days after the start of storage.

COMPARATIVE EXAMPLE 8

The same procedures as those described in Example 1 were carried out except that a polymerization mixture consisted of 5.88 g (0.02 moles) of 3,3',4,4'-biphenyltetracarboxylic dianhydride, 25.78 g (0.08 moles) of 3,3',4,4'-benzophenonetetracarboxylic dianhydride, 19.83 g (0.1 mole) of 4,4'-diaminodiphenylmethane, 185.6 g of N-methyl-2-pyrrolidone and 5.74 g of water.

After the water-removing process was completed, the resultant solution composition contained 22.4% by weight of a comparative aromatic polyamic acid having a logarithmic viscosity of 0.43 and 0.8% by weight of water, and exhibited a rotation viscosity of 41 poises at 30° C.

When the solution composition was stored at a temperature of 50° C., the stored solution composition exhibited a rotation viscosity of 37 poises 60 days after the start of storage and gelled into an insoluble state 80 days after the start of storage.

EXAMPLE 8 and COMPARATIVE EXAMPLE 9

(Use of aromatic polyamic acid solution composition as an electrically insulating varnish for producing enamelled wire)

(1) Preparation of enamelled wire

In Example 8, enamelled wires were prepared by enamelling 8 times a copper wire having a diameter of 1.0 mm with a varnish consisting of the wholly aromatic polyamic acid solution composition prepared in each of Examples 1 through 7, by using a usual vertical enamel-backing furnace in which the heating temperature was adjusted to 400° C. and the copper wire moved at a speed of 5 m/min.

(2) Appearance of resultant coating layer and salt water-resistance of enamelled wire The salt water-resistance of the enamelled wire was determined in accordance with the method described in JIS C 3003, 11.1 in such a manner that two pieces of the enamelled wire were twisted, the twisted specimen was deformed into a U-shape, the twisted portion of the U-shaped specimen having a length of 10 cm was immersed in an aqueous solution containing 0.4% by weight of sodium chloride, an alternating voltage of 200 volts was applied between the two pieces of the enamelled wire, and a time period necessary for reaching an electric current value of 0.1 ampere was measured. The salt water resistance of the enamelled wire was represented by the measured time period in hours.

The results are indicated in Table 1.

In Comparative Example 9, the same procedures as those described above were carried out, except that the electrically insulating varnish used consisted of each of the wholly aromatic polyamic acid solution compositions prepared in Comparative Examples 1 and 2. The results are shown in Table 1.

TABLE 1

| Example No. | Source of varnish | Enamelled wire Appearance of coating layer | Salt water-resistance (hour) |
|---|---|---|---|
| Example 8 | Example 1 | Clear | >1000 |
|  | Example 2 | " | >1000 |
|  | Example 3 | " | >1000 |
|  | Example 4 | " | >1000 |
|  | Example 5 | " | >1000 |
|  | Example 6 | " | >1000 |
|  | Example 7 | " | >1000 |
| Comparative Example 9 | Comparative Example 1 | Opaque | 3.5 |
|  | Comparative Example 2 | " | 78 |

EXAMPLE 9

A film was prepared from each of the wholly aromatic polyamic acid solution compositions prepared in Examples 1 to 7 and the mechanical strength of the resultant film was determined in the following manner.

A wholly aromatic polymeric acid solution composition prepared in each of Examples 1 to 7 was spread on a horizontal upper surface of a glass plate by using a doctor knife to form a thin layer of the solution composition with a uniform thickness. The layer of the solution composition was dried in a nitrogen gas atmosphere at a temperature of 80° C. for 30 minutes to form a solidified precursory film consisting of the aromatic polyamic acid.

The temperature of the precursory film was elevated to a temperature of 300° C. over 60 minutes and was then maintained at 300° C. for 30 minutes to convert the aromatic polyamic acid precursory film to a film consisting of the corresponding aromatic polyimide film having a thickness of 25 microns.

From the resultant aromatic polyimide film, a test specimen having a length of 100 mm and a width of 10 mm was prepared. The specimen was subjected to a measurement of tensile strength and ultimate elongation thereof by using a Autograph DSS-5000 (made by Shimazu Seisakusho) in which both end portions of the specimen were gripped with a pair of chucks at an interval of 50 mm and the specimen was stretched at a speed of 50 mm/min.

The results are shown in Table 2.

TABLE 2

| Source of polyamic acid solution composition | Tensile strength (Kg/mm$^2$) | Ultimate elongation (%) |
|---|---|---|
| Example 1 | 17.0 | 63 |
| 2 | 17.5 | 65 |
| 3 | 16.8 | 70 |
| 4 | 16.5 | 60 |
| 5 | 14.9 | 26 |
| 6 | 13.3 | 20 |
| 7 | 18.1 | 67 |

EXAMPLE 10

A column type polymerization vessel having a capacity of 300 ml was charged with a polymerization mixture consisting of 20.95 g (0.07 moles) of 3,3',4,4'-biphenyltetracarboxylic dianhydride, 6.54 g (0.03 moles) of pyromellitic dianhydride, 20.02 g (0.1 moles) of 4,4'-diaminodiphenylether, 198.0 g of N-methyl-2-pyrrolidone and 22.00 g of water. The polymerization mixture was stirred at a temperature of 50° C. under ambient atmospheric pressure for 44 hours. A polymer solution containing the resultant aromatic polyamic acid having a logarithmic viscosity number of 0.68 determined in a concentration of 0.5 g/100 ml in N-methyl-2-pyrrolidone at a temperature of 30° C.

The polymer liquid was subjected to a water-removing process under a reduced pressure of 0.01 atmospheres at a temperature of 50° C. for 2 hours. The resultant wholly aromatic polyamic acid solution composition contained 1.1% by weight of water which was determined in accordance with Karl Fischer's method. The solution composition also contained 20.0% by weight of the aromatic polyamic acid and exhibited a rotation viscosity of 48 poises determined at a temperature of 30° C.

After the solution composition was stored at a temperature of 30° C. for 30 days, it was found that the rotation viscosity of the solution composition was 50 poises at 30° C. Also, after the solution composition was stored at a temperature of 30° C. for 120 days, it was found that the rotation viscosity of the solution composition was 67 poises at 30° C. However, it was found that the storage of the solution composition at 50° C. for 30 days caused the viscosity of the solution composition to be 62 poises.

In all of the above-mentioned storage tests, the stored solution compositions of the present invention were maintained at a state of a uniform clear solution without the undesirable formation of precipitates.

EXAMPLE 11

A polymerization liquid containing an aromatic polyamic acid was prepared in the same manner as that described in Example 10, except that the polymerization mixture consisted of 20.59 g (0.07 moles) of 3,3',4,4'-biphenyltetracarboxylic dianhydride, 6.54 g (0.03 moles) of pyromellitic dianhydride, 16.02 g (0.08 moles) of 4,4'-diaminodiphenylether, 2.16 g (0.02 moles) of m-phenylenediamine, 166.74 g of N-methyl-2-pyrrolidone and 14.50 g of water, and the polymerization procedure was carried out at a temperature of 70° C. for 4 hours. The resultant polymer solution contained an aromatic polyamic acid having a logarithmic viscosity number of 0.49. The polymer solution was subjected to the same water-removing process as that described in Example 1. The resultant solution composition contained 23.0% by weight of the aromatic polyamic acid and 0.9% by weight of water and had a rotation viscosity of 61 poises at 30° C.

When the solution composition was stored at a temperature of 30° C., the rotation viscosity of the solution composition slightly increased to 64 poises after 30 days of storage. Also, the storage of the solution composition at 50° C. for 30 days resulted in a rotation viscosity of 73 poises of the solution composition. The stored solution compositions were maintained a state of a uniform clear solution without the formation of precipitates.

EXAMPLE 12

A polymerization liquid containing an aromatic polyamic acid was prepared in the same manner as that described in Example 10, except that the polymerization mixture consisted of 17.65 g (0.06 moles) of 3,3',4,4'-biphenyltetracarboxylic dianhydride, 8.72 g (0.04 moles) of pyromellitic dianhydride, 20.02 g (0.10 moles) of 4,4'-diaminodiphenylether, 173.43 g of dimethylacetamide and 11.13 g of water, and the polymerization procedure was carried out at a temperature of 50° C. for 24 hours. The resultant polymer solution contained an aromatic polyamic acid having a logarithmic viscosity number of 0.53. The polymer solution was subjected to the same water-removing process as that described in Example 1. The resultant solution composition contained 23.8% by weight of the aromatic polyamic acid and 0.5% by weight of water and had a rotation viscosity of 68 poises at 30° C.

When the solution composition was stored at a temperature of 30° C., the rotation viscosity of the solution composition slightly increased to 72 poises after 30 days of storage. Also, the storage of the solution composition at 50° C. for 30 days resulted in an increased rotation viscosity 89 poises of the solution composition. The stored solution compositions were maintained in a state of a uniform clear solution without the formation of precipitates.

EXAMPLE 13

A polymerization liquid containing an aromatic polyamic acid was prepared in the same manner as that described in Example 10, except that the polymerization mixture consisted of 14.71 g (0.05 moles) of 3,3',4,4'-biphenyltetracarboxylic dianhydride, 10.91 g (0.05 moles) of pyromellitic dianhydride, 20.02 g (0.10 moles) of 4,4'-diaminodiphenylether, 173.43 g of N-methyl-2-pyrrolidone and 9.13 g of water, and the polymerization procedure was carried out at a temperature of 50° C. for 24 hours. The resultant polymer solution contained an aromatic polyamic acid having a logarithmic viscosity number of 0.59. The polymer solution was subjected to the same water-removing process as that described in Example 1. The resultant solution composition contained 21.8% by weight of the aromatic polyamic acid and 0.7% by weight of water and had a rotation viscosity of 53 poises at 30° C.

When the solution composition was stored at a temperature of 30° C., the rotation viscosity of the solution composition slightly increased to 57 poises after 30 days of storage. Also, the storage of the solution composition at 50° C. for 30 days resulted in a rotation viscosity of 90 poises of the solution composition. The stored solution compositions were maintained in a state of a uniform clear solution without the formation of precipitates.

EXAMPLE 14

A polymerization liquid containing an aromatic polyamic acid was prepared in the same manner as that described in Example 10, except that the polymerization mixture consisted of 11.77 g (0.04 moles) of 3,3',4,4'-biphenyltetracarboxylic dianhydride, 13.09 g (0.06 moles) of pyromellitic dianhydride, 20.02 g (0.10 moles) of 4,4'-diaminodiphenylether, 170.54 g of dimethylsulfoxide and 8.98 g of water, and the polymerization procedure was carried out at a temperature of 50° C. for 24 hours. The resultant polymer solution contained an aromatic polyamic acid having a logarithmic viscosity number of 0.49. The polymer solution was subjected to the same water-removing process as that described in Example 1. The resultant solution composition contained 24.1% by weight of the aromatic polyamic acid and 0.5% by weight of water and had a rotation viscosity of 58 poises at 30° C.

When the solution composition was stored at a temperature of 30° C., the rotation viscosity of the solution composition slightly increased to 63 poises after 30 days of storage. Also after 30 days of storage at a temperature of 50° C., the rotation viscosity of the solution composition increased to 116 poises. The stored solution composition was maintained in a state of a uniform clear solution without the formation of precipitates.

EXAMPLE 15

A polymerization liquid containing an aromatic polyamic acid was prepared in the same manner as that described in Example 10, except that the polymerization mixture consisted of 8.83 g (0.03 moles) of 3,3',4,4'-biphenyltetracarboxylic dianhydride, 15.27 g (0.07 moles) of pyromellitic dianhydride, 16.02 g (0.08 moles) of 4,4'-diaminodiphenylether, 3.97 g (0.02 moles) of 4,4'-diaminodiphenylmethane, 169.31 g of N-methyl-2-pyrrolidone and 7.05 g of water and the polymerization temperature and time were 50° C. and 20 hours, respectively. The resultant polymer solution contained an aromatic polyamic acid having a logarithmic viscosity number of 0.58. The polymer solution was subjected to the same water-removing process as that described in Example 1. The resultant solution composition contained 21.3% by weight of the aromatic polyamic acid and 0.6% by weight of water and had a rotation viscosity of 45 poises at 30° C.

When the solution composition was stored at a temperature of 30° C., the rotation viscosity of the solution composition slightly increased to 50 poises after 30 days of storage. Also, after the storage for 30 days at a temperature of 50° C., the solution composition exhibited a rotation viscosity of 116 poises. During the storages, the solution compositions were maintained in a state of a clear uniform solution without the formation of precipitates.

EXAMPLE 16

The same procedures as those described in Example 10 were carried out, except that the aromatic polyamic acid solution composition was prepared in the following manner.

A mixture consisting of 19.12 g (0.065 moles) of 3,3',4,4'-biphenyltetracarboxylic dianhydride, 6.54 g (0.03 moles) of pyromellitic dianhydride, 20.02 g (0.18 moles) of 4,4'-diaminodiphenylether, and 188.60 g of N-methyl-2-pyrrolidone was subjected to a polymerization procedure in a column type polymerization vessel with a capacity of 300 ml at a temperature of 30° C. under ambient atmospheric pressure for 6 hours while it is stirred. The resultant polymerization liquid mixed with 1.92 g (0.005 moles) of 3,3',4,4'-biphenyltetracarboxylic tetramethylester dissolved therein to provide an aromatic polyamic acid solution composition.

The solution composition contained 20.0% by weight of an aromatic polyamic acid having a logarithmic viscosity number of 0.48 and exhibited a rotation viscosity of 15 poises at 30° C.

The rotation viscosity of the solution composition changed to 16 poises after storage for 30 days at a temperature of 30° C. and to 20 poises after storage of 30 days at a temperature of 50° C. During the storages, the solution composition maintained a state of a clear, uniform solution containing no precipitates.

EXAMPLE 17

The same procedures as those described in Example 16 were carried out, except that 3,3',4,4'-biphenyltetracarboxylic dianhydride and pyromellitic dianhydride were used in amounts of 20.59 g (0.07 moles) and 5.46 g (0.025 moles), respectively, and the 3,3',4,4'-biphenyltetracarboxylic tetramethylester was replaced by 1.27 g (0.005 moles) of pyromellitic acid.

The resultant solution composition contained 20.0% by weight of an aromatic polyamic acid having a logarithmic viscosity number of 0.66 and exhibited a rotation viscosity of 42 poises at 30° C.

The storage of the solution composition at a temperature of 30° C. for 30 days caused the solution composition to exhibit a slightly increased rotation viscosity of 45 poises. When the solution composition was stored at a temperature of 50° C. for 30 days, the rotation viscosity of the solution composition changed to 60 poises. During the above-mentioned storage periods, the solution composition was maintained in a state of a clear, uniform solution containing no precipitates.

EXAMPLE 18

(1) Preparation of Oligomeric Intermediate C

A column type polymerization vessel having a capacity of 300 ml was charged with a pre-polymerization mixture consisting of 11.77 g (0.04 moles) of 3,3',4,4'-biphenyltetracarboxylic dianhydride, 4.00 g (0.02 moles) of 4,4'-diaminodiphenylether and 63.09 g of N-methyl-2-pyrrolidone. The pre-polymerization mixture was stirred at a temperature of 50° C. under ambient atmospheric pressure for 3 hours. The resultant oligomeric intermediate C was a dispersion containing an oligomer and non-reacted 3,3',4,4'-biphenyl tetracarboxylic dianhydride.

(2) Preparation of Oligomeric Intermediate D

The same type of vessel as that mentioned above and having a capacity of 300 ml was charged with a pre-polymerization mixture consisting of 13.09 g (0.06 moles of pyromellitic dianhydride, 18.02 g (0.09 moles) of 4,4'-diaminodiphenylether and 124.45 g of N-methyl-2-pyrrolidone. The pre-polymerization mixture was stirred at a temperature of 50° C. under ambient atmospheric pressure for 3 hours. The resultant pre-polymerization liquid was a clear uniform solution containing 20% by weight of an oligomeric intermediate D and exhibited a rotation viscosity of 2.5 poises at 30° C.

(3) Preparation of Aromatic Polyamic Acid Solution Composition

A polymerization mixture consisting of 78.86 g of the oligomeric intermediate C and 103.71 g of the oligomeric intermediate D was subjected to a polymerization at a temperature of 50° C. for 3 hours while it is stirred.

The resultant aromatic polyamic acid solution composition contained 20.0% by weight of the polyamic acid having a logarithmic viscosity of 0.66, and exhibited a rotation viscosity of 45 poises at 30° C.

The rotation viscosity of the solution composition was changed to 55 poises after storage for 30 days at 30° C. and to 100 poises after storage of 30 days at 50° C. The above-mentioned stored solution composition was in a state of a clear uniform solution and contained no precipitates.

COMPARATIVE EXAMPLE 10

The more procedures as those described in Example 10 were carried out except that a polymerization mixture consisted of 21.81 g (0.1 mole) of pyromellitic dianhydride, 20.02 g (0.1 mole) of 4,4'-diaminodiphenylether, 151.75 g of N-methyl-2-pyrrolidone and 4.69 of water and the polymerization temperature and time were 50° C. and 40 hours, respectively.

After the water-removing process was completed, the resultant solution composition contained 22.1% by weight of a comparative aromatic polyamic acid having a logarithmic viscosity of 0.59 and 0.7% by weight of water, and exhibited a rotation viscosity of 90 poises at 30° C.

When the solution composition was stored at a temperature of 30° C., the stored solution composition exhibited an increased rotation viscosity of 155 poises 30 days after the start of storage and a remarkably increased rotation viscosity of 2000 poises 120 days after the start of storage. When stored at a temperature of 50° C., the rotation viscosity of the solution composition rapidly increased to 270 poises after 10 days of storage and then, after 20 days of storage, the solution composition gelled into an insoluble state.

COMPARATIVE EXAMPLE 11

The same procedures as those described in Example 10 were carried out, except that a polymerization mixture consisted of 2.94 g (0.01 mole) of 3,3',-4,4'-biphenyltetracarboxylic dianhydride, 19.63 g (0.09 moles) of pyromellitic dianhydride, 20.02 g (0.1 mole) of 4,4-diaminodiphenylether, 165.25 g of N-methyl-2-pyrrolidone and 5.11 g of water and the polymerization temperature and time were 50° C. and 20 hours, respectively.

After the water-removing process was completed, the resultant solution composition contained 22.3% by weight of a comparative aromatic polyamic acid having a logarithmic viscosity of 0.55 and 0.8% by weight of water, and exhibited a rotation viscosity of 52 poises at 30° C.

When the solution composition was stored at a temperature of 30° C. for 30 days, the stored solution composition exhibited a significantly increased rotation viscosity of 77 poises. When stored at 50° C. for 30 days, the solution composition gelled into an insoluble state.

COMPARATIVE EXAMPLE 12

The same procedures as those described in Example 10 were carried out, except that a polymerization mixture consisted of 5.88 g (0.02 moles) of 3,3',-4,4'-biphenyltetracarboxylic dianhydride, 17.45 g (0.08 moles) of pyromellitic dianhydride, 20.02 g (0.1 mole) of 4,4'-diaminodiphenylether, 166.5 g of N-methyl-2-pyrrolidone and 6.94 of water and the polymerization temperature and time were 50° C. and 20 hours, respectively.

After the water-removing process was completed, the resultant solution composition contained 21.7% by weight of a comparative aromatic polyamic acid having a logarithmic viscosity of 0.63 and 0.8% by weight of water, and exhibited a rotation viscosity of 60 poises at 30° C.

When the solution composition was stored at a temperature of 30° C. for 30 days, the stored solution composition exhibited an increased rotation viscosity of 86 poises. When the storage was carried out at a temperature of 50° C., the solution composition gelled into an insoluble state 30 days after the start of storage.

COMPARATIVE EXAMPLE 13

The same procedures as those described in Example 10 were carried out, except that a polymerization mixture consisted of 5.88 g (0.02 moles) of 3,3',-4,4'-biphenyltetracarboxylic dianhydride, 17.45 g (0.08 moles) of pyromellitic dianhydride, 16.02 g (0.08 moles) of 4,4'-diaminodiphenylether, 2.16 g (0.02 moles) of m-phenylenediamine, 161.6 g of N-methyl-2-pyrrolidone and 4.98 g of water and the polymerization temperature and time were 50° C. and 20 hours, respectively.

After the water-removing process was completed, the resultant solution composition contained 21.2% by weight of a comparative aromatic polyamic acid having a logarithmic viscosity of 0.64 and 0.5% by weight of water, and exhibited a rotation viscosity of 54 poises at 30° C.

When the solution composition was stored at a temperature of 30° C. for 30 days, the stored solution composition exhibited an increased rotation viscosity of 76 poises. When the storage was carried out at a temperature of 50° C. for 30 days, the solution composition exhibited a significantly increased rotation viscosity of 210 poises.

COMPARATIVE EXAMPLE 14

The same procedures as those described in Example 10 were carried out, except that a polymerization mixture consisted of 29.42 g (0.1 mole) of 3,3',-4,4'-biphenyltetracarboxylic dianhydride, 20.02 g (0.1 mole) of 4,4'-diaminodiphenylether, 178.00 g of N-methyl-2-pyrrolidone and 19.71 g of water.

After the water-removing process was completed, the resultant solution composition contained 24.4% by weight of a comparative aromatic polyamic acid having a logarithmic viscosity of 0.57 and 1.0% by weight of water, and exhibited a rotation viscosity of 50 poises at 30° C.

The resultant solution composition exhibited a similar storage stability as that obtained in Example 10.

COMPARATIVE EXAMPLE 15

The same procedures as those described in Example 10 were carried out except that a polymerization mixture consisted of 26.48 g (0.09 moles) of 3,3',4,4'-biphenyltetracarboxylic dianhydride, 2.18 g (0.01 mole) of pyrrolidone dianhydride, 20.02 g (0.1 mole) of 4,4'-diaminodiphenylether, 175.25 g of N-methyl-2-pyrrolidone and 19.47 g of water.

After the water-removing process was completed, the resultant solution composition contained 23.0% by weight of a comparative aromatic acid having a logarithmic viscosity of 0.53 and 1.1% by weight of water, and exhibited a rotation viscosity of 50 poises at 30° C.

The storage stability of the resultant solution composition was similar to that obtained in Example 10.

COMPARATIVE EXAMPLE 16

The same procedures as those described in Example 10 were carried out, except that a polymerization mixture consisted of 23.54 g (0.08 moles) of 3,3',-4,4'-biphenyltetracarboxylic dianhydride, 4.36 g (0.02 moles) of pyromellitic dianhydride, 20.02 g (0.1 mole) of 4,4'-diaminodiphenylether, 172.51 g of N-methyl-2-pyrrolidone and 19.17 g of water.

After the water-removing process was completed, the resultant solution composition contained 22.4% by weight of a comparative aromatic polyamic acid having a logarithmic viscosity of 0.50 and 1.0% by weight of water, and exhibited a rotation viscosity of 41 poises at 30° C.

The solution composition exhibited the similar storage stability as that obtained in Example 10.

EXAMPLE 19 AND COMPARATIVE EXAMPLE 17

In Example 19, the same procedures as those described in Example 8 were carried out, except that the copper wire was enamelled with a varnish consisting of each of the aromatic polyamic acid solution compositions prepared in Examples 10 through 18 and the degree of alkali-resistance of each enamelled wire was determined in the following manner.

The same type of specimen as that used for the salt water-resistance test was used. A twisted portion of the specimen having a length of 10 cm was immersed in an aqueous solution containing 10% by weight of sodium hydroxide. An alternating voltage of 200 volts was applied between the two pieces of the enamelled wire. A time period necessary for the value of the electric current flowing between the two pieces of the enamelled wire through the sodium hydroxide solution to reach 0.1 ampere, was measured. The alkali resistance of the enamelled wire was represented by the measured time period in hours.

The results are indicated in Table 3.

In Comparative Example 17, the same procedures as except that the varnish used consisted of each of the aromatic polyamic acid solution compositions prepared in Comparative Examples 10 to 16. The results are shown in Table 3.

TABLE 3

| Example No. | Source of varnish | Enamelled wire | | |
|---|---|---|---|---|
| | | Appearance of coating layer | Salt water-resistance (hour) | Alkali-resistance (hour) |
| Example 19 | Example 10 | Clear | >1000 | 15 |
| | Example 11 | " | >1000 | 14 |
| | Example 12 | " | >1000 | 13.5 |
| | Example 13 | " | >1000 | 13 |
| | Example 14 | " | >1000 | 11.5 |
| | Example 15 | " | >1000 | 9.5 |
| | Example 16 | " | >1000 | 14 |
| | Example 17 | " | >1000 | 13.5 |
| | Example 18 | " | >1000 | 12.5 |
| Comparative Example 17 | Comparative Example 10 | " | >1000 | <1 |
| | Comparative Example 11 | " | >1000 | <1 |
| | Comparative Example 12 | " | >1000 | 1.3 |
| | Comparative Example 13 | " | >1000 | <1 |
| | Comparative Example 14 | Opaque | 3 | <1 |
| | Comparative Example 15 | " | 15 | <1 |
| | Comparative Example 16 | " | 80 | <1 |

Table 3 shows that the coating layers formed from the aromatic polyamic acid solution compositions prepared in Comparative Example 14, 15, and 16 were opaque and unsatisfactory in appearance. Also, these coating layers exhibited a poor salt-water resistance and alkali-resistance.

Furthermore, the coating layers prepared from the aromatic polyamic acid solution compositions of Comparative Examples 10 to 13 had an unsatisfactory alkali-resistance.

EXAMPLE 20 AND COMPARATIVE EXAMPLE 18

The enamelled wires prepared in Examples 19 and the comparative enamelled wire prepared in Comparative Example 17 by using the aromatic polyamic acid solution composition of Comparative Example 10 were subjected to measurements of the thickness of the coating layer, number of pin holes in the coating layer, resistance to abrasion of coating layer under a load of 700 g, and the dielectric breakdown voltage of the coating layer.

The results are shown in Table 4.

TABLE 4

| Example No. | Source of varnish | Coating layer Thickness ($\mu$m) | Number of pinholes per_m | Resistance to abrasion | Dielectric breakdown voltage (KV) |
|---|---|---|---|---|---|
| Example 20 | Example 10 | 42 | 0 | 98 | 11.8 |
|  | Example 11 | 40 | 0 | 87 | 13.2 |
|  | Example 12 | 41 | 0 | 84 | 12.5 |
|  | Example 13 | 43 | 0 | 72 | 12.0 |
|  | Example 14 | 40 | 0 | 69 | 12.3 |
|  | Example 15 | 42 | 0 | 63 | 11.9 |
|  | Example 16 | 41 | 0 | 83 | 11.9 |
|  | Example 17 | 41 | 0 | 85 | 12.2 |
|  | Example 18 | 40 | 0 | 76 | 13.0 |
| Comparative Example 18 | Comparative Example 10 | 42 | 0 | 12 | 11.7 |

The coating layer derived from Comparative Example 10 had an unsatisfactory abrasion-resistance.

EXAMPLE 21

The same procedures as those described in Example 9 were carried out, except that the films were prepared from each of the aromatic polyamic acid solution compositions prepared in Examples 10 to 18, and these films were subjected to the measurement of the heat resistance thereof. The heat resistance of the films was measured in such a manner that the weight ($W_0$) of each film was measured, each film was placed on a thermobalance and heated at a heating rate of 10° C./min in air atmosphere and, when the temperature of the film reached 500° C., the weight ($W$) of the film was measured. The heat resistance of the film was calculated in accordance with the following equation:

$$\text{Heat resistance (\%)} = \frac{W_0 - W}{W_0} \times 100$$

The results are shown in Table 5.

TABLE 5

| Source of aromatic polyamic acid solution composition | Tensile strength (kg/mm$^2$) | Ultimate elongation (%) | Heat-resistance (%) |
|---|---|---|---|
| Example 10 | 19.1 | 74 | <5 |
| Example 11 | 18.5 | 70 | <5 |
| Example 12 | 19.3 | 76 | <5 |
| Example 13 | 18.1 | 90 | <5 |
| Example 14 | 17.8 | 85 | <5 |
| Example 15 | 17.3 | 67 | <5 |
| Example 16 | 15.9 | 70 | <5 |

TABLE 5-continued

| Source of aromatic polyamic acid solution composition | Tensile strength (kg/mm$^2$) | Ultimate elongation (%) | Heat-resistance (%) |
|---|---|---|---|
| Example 17 | 19.8 | 75 | <5 |
| Example 18 | 17.9 | 77 | <5 |

We claim:

1. An aromatic polyamic acid solution composition comprising:

(1) an aromatic polyamic acid which is a polymerization product of (A) a tetracarboxylic acid component containing at least 80 molar % of the sum of (a) a first acid ingredient consisting of at least one member selected from the group consisting of 3,3',4,4'-biphenyl tetracarboxylic dianhydride and its functional derivatives and (b) a second acid ingredient consisting of at least one member selected from the group consisting of pyromellitic dianhydride, its functional derivatives, 3,3',4,4'-benzophenone tetracarboxylic dianhydride and it functional derivatives, the molar ratio of the first acid ingredient to the second acid ingredient being in the range of from 30:70 to 75:25, with (B) an amine component consisting of at least one aromatic diamine in a molar ratio of said tetracarboxylic acid component to said amine component of from 97:100 to 103:100, said amine component being selected from the group consisting of those of the formulae (I), (II) and (III).

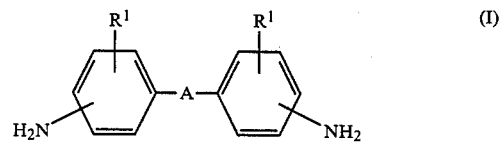

(I)

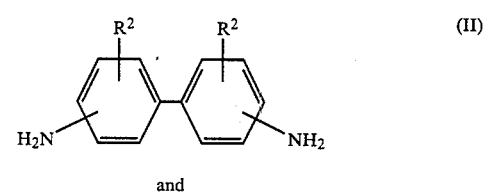

(II)

and

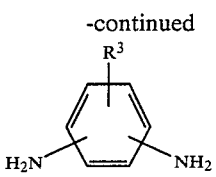

wherein $R^1$, $R^2$ and $R^3$ respectively represent, independent from each other, a member selected from the group consisting of a hydrogen atom, alkyl radicals having 1 to 5 carbon atoms, carboxyl radical, and alkoxyl radicals having 1 to 5 carbon atoms, and A represents a divalent radical selected from the group consisting of those of the formulae: —O—, —S—, —CO—, —SO$_2$—, —SO—, and —CH$_2$— and which polyamic acid has a logarithmic viscosity number of from 0.1 to 1.5 determined in a concentration of 0.5 g/100 ml in N-methyl-2- pyrrolidone at a temperature of 30° C., and dissolved in a concentration of from 5% to 40% by weight in (2) at least one organic polar solvent having a boiling point of 300° C. or less under atmospheric pressure.

2. The solution composition as claimed in claim 1, wherein the molar ratio of the first acid ingredient to the second acid ingredient is in the range of from 45:55 to 75:25.

3. The solution composition as claimed in claim 1, wherein the sum of the first acid ingredient and the second acid ingredient is contained in an amount of 90 molar % or more in said tetracarboxylic acid component.

4. The solution composition as claimed in claim 1, wherein said tetracarboxylic acid component consists essentially of the sum of the first and second acid ingredients.

5. The solution composition as claimed in claim 1, wherein said amine component consists essentially of 4,4-diaminodiphenylether alone.

6. The solution composition as claimed in claim 1, wherein said amine component consists essentially of at least 70 molar % of 4,4'-diaminodiphenylether and 30 molar % or less of at least one aromatic diamine compound different from 4,4'-diaminodiphenylether.

7. The solution composition as claimed in claim 1, wherein the concentration of said polyamic acid is in the range of from 10% to 35% by weight.

8. The solution composition as claimed in claim 1, wherein said organic polar liquid compound is selected from the group consisting of N-methyl-2-pyrrolidone, dimethylfulfoxide, N,N-dimethylacetamide, N,N-dimethylformamide, N,N-diethylacetamide and N,N-diethylformamide.

9. The solution composition as claimed in claim 1, wherein said solvent contains 3% by weight or less of water based on the entire weight of said solution composition.

10. The solution composition as claimed in claim 1, which exhibits a rotation viscosity of from 0.1 to 10,000 poises at a temperature of 30° C.

* * * * *